United States Patent [19]

Agrawal et al.

[11] Patent Number: 5,255,483
[45] Date of Patent: Oct. 26, 1993

[54] SQUEAK RESISTANT PANEL/WINDOW ASSEMBLY FOR VEHICLES

[75] Inventors: Raj K. Agrawal; John F. Thomas, both of Holland, Mich.

[73] Assignee: Donnelly Corporation, Holland, Mich.

[21] Appl. No.: 752,833

[22] Filed: Aug. 30, 1991

[51] Int. Cl.⁵ .............................................. E04B 1/62
[52] U.S. Cl. .................................... 52/397; 106/245; 296/93
[58] Field of Search ............... 52/397, 400; 252/25, 252/29; 106/245, 272; 296/76, 89, 93

[56] References Cited

U.S. PATENT DOCUMENTS

| | | | |
|---|---|---|---|
| 101,868 | 4/1870 | Gwynn | 252/25 |
| 183,343 | 10/1876 | Sweeney | 106/245 |
| 263,911 | 9/1882 | Inman | 252/25 |
| 2,269,720 | 1/1942 | Johnson | 252/25 |
| 2,361,522 | 10/1944 | Zimmer et al. | 252/25 |
| 2,530,838 | 11/1950 | Orozco | 252/25 |
| 3,014,865 | 12/1961 | Seniff | 252/25 |
| 3,661,401 | 5/1972 | Farnam | 277/227 |
| 3,854,736 | 12/1974 | Farnam | 277/204 |
| 4,070,219 | 1/1978 | Farnam | 427/393.5 X |
| 4,140,834 | 2/1979 | Marcantonio et al. | 252/29 X |
| 4,519,965 | 5/1985 | Taylor et al. | |
| 4,581,386 | 4/1986 | Taylor et al. | |
| 4,581,387 | 4/1986 | Werner et al. | |
| 4,585,803 | 4/1986 | Nelson et al. | |
| 4,753,966 | 6/1988 | Haas et al. | 252/182.13 X |
| 4,757,659 | 7/1988 | Miyakawa et al. | 52/400 |
| 4,876,019 | 10/1989 | Meyer et al. | 252/32.5 |
| 4,983,659 | 1/1991 | Gillis et al. | 252/182.23 X |
| 5,002,999 | 3/1991 | Lowery et al. | 252/182.13 X |
| 5,008,033 | 4/1991 | Meyer et al. | 252/182.13 |
| 5,043,382 | 8/1991 | Meyer et al. | 252/32.5 X |

Primary Examiner—Carl D. Friedman
Assistant Examiner—Robert Canfield
Attorney, Agent, or Firm—Price, Heneveld, Cooper, DeWitt & Litton

[57] ABSTRACT

A vehicle panel/window assembly and accompanying methods of manufacture are disclosed utilizing a composition to eliminate or minimize squeaks or other undesirable noises that often originate from the panel/window and vehicle body interface during vehicle movement. The squeak resistant composition may be applied to the polymeric gasket as an in-mold release agent, as an in mold-coating, or applied after gasket manufacture and comprises a waxy material softening at above about 80° C. and a lubricant.

11 Claims, 2 Drawing Sheets

SQUEAK RESISTANT PANEL/WINDOW ASSEMBLY FOR VEHICLES

BACKGROUND OF THE INVENTION

The term "panel assemblies" as used refers to transparent, semi-transparent, opaque, and like panels framed by a gasket for incorporation in vehicle bodies or structures. Such panel assemblies typically comprise panels of window glass, however may include automobile taillight assemblies, decorative panels and the like.

Modern panel or window assemblies for use in automobiles are typically of two varieties. The first are modular or encapsulated window assemblies where the perimeter of the transparent panel has a gasket molded around it. The second type, referred to as laced window assemblies, utilize a gasket which is produced separately and then either attached to the perimeter of the panel or placed within the vehicle window mounting channel prior to mounting of the window. In either type of window assembly, the gasket serves as an interface between the window glass and the window mounting channel or surface of the vehicle body.

The gasket is typically a polymeric material such as EPDM rubbers (terpolymer of ethylene, propylene and diene monomers), polyvinyl chloride, olefinic polymers, thermosetting polymers, urethane, thermoplastic urethanes and thermoplastic elastomers. EPDM rubber is most commonly used for laced window assembly gaskets. Reaction injection molded (RIM) urethane and polyvinyl chloride are most commonly used for modular window assembly gaskets.

The gasket materials used today, especially the urethane used in modular window assemblies, are relatively stiff, having a tensile modulus at 100% elongation from about 1,000 to about 50,000 psi. The recent trend in using stiffer gaskets was prompted by the deficiencies inherent in the softer gasket materials known in the prior art, such as EPDM rubber. The softer materials do not provide and maintain as good a seal between the vehicle interior and external environment as do today's stiffer materials. Secondly, gaskets formed from softer materials are not as aesthetically appealing as stiffer materials in view of resulting bulges, shape deformation and irregularities in the softer material upon weathering, once the window assembly is mounted in the vehicle.

Various squeaks and other undesirable noises are often generated around such window assemblies, regardless of the gasket material used. The generation of such noises is believed to result from differing degrees of rigidity between the window assembly and the vehicle body, primarily at the interface between the vehicle body and the window assembly. This behavior is particularly evident as the vehicle body shifts, torques or vibrates from uneven road surfaces or changes in the vehicle's velocity. The importance of suppressing such unwanted noises has become of increasing importance to auto manufacturers.

SUMMARY OF THE INVENTION

The present invention is a panel assembly having a polymeric gasket, which contains a relatively thin coating of a composition containing a waxy binder and a lubricant. The composition may be applied to the gasket in a variety of methods, however the preferred means is to utilize the composition in a solution or coating as a mold release agent. The resulting panel or window assembly substantially eliminates or suppresses audible squeaks and other undesirable noises.

DESCRIPTION OF THE PREFERRED EMBODIMENTS

Figure 1:
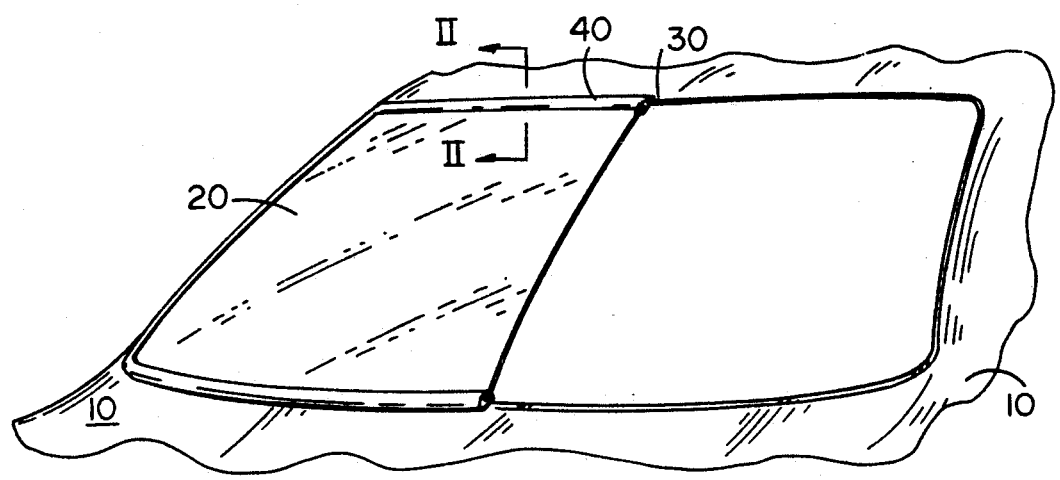
FIG. 1 is a perspective, partially sectional view of a typical window assembly and vehicle body mounting channel.
Figure 2:
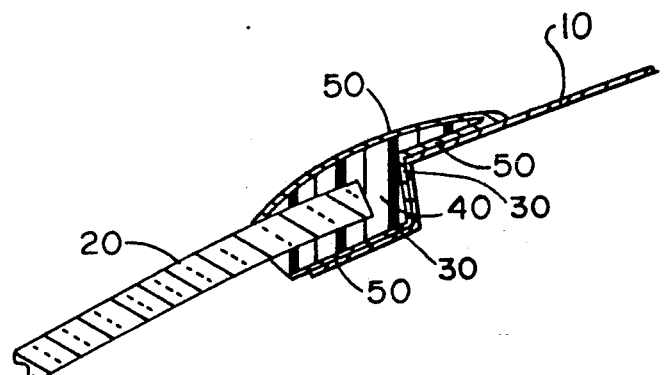
FIG. 2 is a cross-section, taken along plane II—II of FIG. 1.

Referring to FIG. 1, a typical automotive application is shown, where vehicle body 10 has window assembly 20 mounted therein in mounting channel 30. A gasket 40 is utilized to seal the area between the two surfaces, 20 and 30. FIG. 2 represents a magnified cross-section of the window edge 20 and gasket 40. A relatively thin coating 50 of squeak resistant composition covers at least those portions of gasket 40 which engage the vehicle body 10. Although not so limited, the present invention is especially beneficial for modular window assemblies as their relative gasket stiffness makes them particularly susceptible to unwanted noises.

Coating 50 of the present invention contains a binder which is essentially a relatively high softening point waxy substance, and a lubricant which is dispersed within the binder. Coating 50 may further contain one or more of the following; plasticizers, carriers, solvents, dispersing agents, surfactants, viscosity modifiers and coloring agents. The critical components are the binder and the lubricant which preferably should exist in a range from 1 part binder (based on solids) to 1/10 part lubricant to 1 part binder to 10 parts lubricant (by weight solids). The overall percentage of these components in the composition will vary depending upon the particular use and the means of application, as noted below. There must be sufficient binder to provide adhesion of the composition to the gasket.

The binder component should have the following properties: a softening point above about 80° C., possess a film forming characteristic, sufficiently adhere to the polymeric material of the gasket, be water insoluble (or sparingly so), have inherent lubricity, have sufficient durability to humidity, sunlight, and temperature effects, and be soluble or dispersible in some type of carrier or solvent. A high softening point is desirable in automotive applications as vehicle surfaces exposed to the sun reach about 65° C., especially in southern localities. Temperature range specifications for other automotive applications typically require use up to about 80° C. At temperatures up to about 80° C., the binder should not soften, so as to prevent the coating of the present invention from abrasion, flowing or seeping. Furthermore, at temperatures substantially below 80° C., i.e. −20° C., the binder should not crack or fracture upon exposure to stresses that may be encountered during normal vehicle operation. Also, the binder component should have a film forming characteristic so that when dispersed or dissolved in a solvent or carrier for spray or brush applications, the outer surface layer should not flake off.

In the preferred embodiment, the binder is a wax or blend of waxes having the above properties. The wax may be either synthetic or natural. Examples of natural waxes are animal waxes such as beeswax, and spermaceti from sperm whale; vegetable waxes such as carnauba wax, and Japan wax and mineral waxes such as paraffin wax, ozokerite, and ceresin. Examples of synthetic waxes are "Opalwax TM" (hydrogenated castor oil) by DuPont TM; "Pentawax-286 TM" (combination of fatty acids and alcohols) by Heyden Newport Chemical Corporation; "Alcowax TM" (polyethylene wax) by Allied Chemical Corporation; and "Marlex 20 TM" (methylene polymer wax) by Phillips Petroleum Company.

The lubricant may be selected from a variety of agents known in the art such as; molybdenum disulfide, tungsten disulfide, graphite, boron nitride, phosphate lubricants, silicones, metallic soaps, fluoropolymer lubricants (i.e. TEFLON TM) and metallic carboxylate lubricants which include metallic stearates. Typical metallic carboxylate lubricants may include stearates, oleates, octoates, palmitates, laurates, behenates, ricinolates and the like. Typical metallic stearates which may be used in the present composition include, but are not limited to; aluminum stearate, barium stearate, calcium stearate, lithium stearate, magnesium stearate, potassium stearate, sodium stearate, strontium stearate, and zinc stearate. Both water soluble and water insoluble lubricants may be utilized, however it is preferred to use a water insoluble lubricant. The primary requirement in selecting a lubricant is that it disperse readily in the binder, and in a solvent or carrier if one is used. The preferred lubricant for use in the present composition is zinc stearate.

Various plasticizers, flexiblizers or softeners may be added to adjust the softening point of the composition as the application demands. The plasticizer may serve to facilitate processing the composition and increase the flexibility of the final composition when applied as a solution or coating. Typical plasticizers include hydrocarbon oils, low molecular weight polymers and organic esters.

Coloring agents or pigments, preferably water insoluble, may be added to the present composition, in amounts as required by the particular application.

Nearly all applications will require the addition of some carrier or solvent to facilitate dispersing the lubricant within the binder and to lower the viscosity of the composition, thereby promoting ease of processing and mixing of the composition. Typically, carrier is added in amounts of at least 10 to 20 percent by weight of the composition, and can be as high as about 95%. The preferred carrier is naptha, that is a mixture of relatively high boiling point hydrocarbons. Naptha is found to sufficiently disperse or dissolve the preferred lubricant of the present invention, zinc stearate. Benzene may be utilized as a co-carrier in conjunction with naptha, such amounts of benzene should not exceed 1 or 2%. Other carriers such as toluene, methyl ethyl ketone, 1,1,1 trichloroethane, hydrocarbons, and chloroform may also be used either independently, or in combination. Of course the selection of such carriers is dictated by binder and lubricant solubility, evaporation rate and safety concerns.

When coating 50 of the present invention is used in accordance with the most preferred embodiment, it has two-fold function. One, is to reduce the level of noise and squeaks between the surface of the gasket and vehicle mounting surface, and a second is to function as an abherent in the gasket manufacture. Numerous molding operations rely on the use of an abherent, or mold release agent. The main requirement for an abherent is that it be chemically inert to at least one of the contacting materials. Abherents function as the opposite of adhesives. The most common and commercially important abherent is silicone due to its chemical inertness and temperature stability. A variety of other abherents known in the industry include waxes, metallic carboxylate lubricants, vinyl compounds, silicones, polyolefins, fatty acids, and fluorocarbon polymers. Coating 50 of the present invention utilizes a particular combination of ingredients, which result in an abherent function during gasket manufacture, while also reducing vehicle noise when the window assembly is installed in the vehicle.

By application as an in-mold abherent, the composition actually penetrates the surface of the gasket material, ensuring intimate contact with the gasket material. The degree of penetration depends upon molding parameters. Actual penetration is preferable to a mere coating of the composition upon the outer surface of the gasket, in that a coating is less durable as compared to the gasket being impregnated, at least near its surface, with the composition.

When the composition is used as an abherent, it is preferable to spray the composition onto the interior surface(s) of the mold prior to injection. It may not be necessary to apply the composition onto the mold surface(s) before each molding operation, as sufficient amounts of the composition may remain on the mold surface(s) for up to 2 or 3 operations before a new application is required. Also, one may first coat the mold with a conventional abherent, such as silicone, and then cover that coating with the composition of the present invention.

Spraying applications typically require a sufficiently low viscosity of the spray mixture such that the overall weight percentage of binder solids and lubricant combined in the spray mixture, after the addition of sufficient solvent, is up to 25%. Of course, the composition could be sprayed onto the surfaces forming the vehicle body and window assembly interface without use as an abherent. Coating 50 could be applied directly to gasket 40 in a post molding operation, or indirectly by applying to mounting channel 30, such that it contacts gasket 40 when the panel assembly is mounted in channel 30.

When the composition is applied in a post-mold fashion to the gasket or window assembly, the extent of coverage is such that the region of gasket and/or window assembly that will contact the vehicle body is sufficiently covered. The thickness of the coating is not critical as long as there is at least one atomic layer of the composition on the outer gasket surface. The coating is so thin when used "in-mold" that it is difficult to measure. In post-mold coating operations, typical thicknesses are from about 2 to about 10 microns. Coatings in excess of about 25 microns may not be aesthetically acceptable.

Other methods of applying the composition to either the interface surfaces or to the mold surfaces may include brushing, wiping, dipping or any other similar means.

Figure 5:
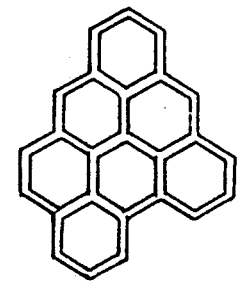
FIG. 5 is an enlarged illustration showing the stipples of the present invention.

The polymeric gasket surrounding the perimeter of the panel or window may optionally contain numerous stipples which are small cavities or depressions formed on the exterior surface of the polymeric gasket material. Such stipples may be formed in a variety of shapes in the gasket material. A typical stipple is a honeycomb-shape depression from about 75 to about 125 microns in depth and about 2,000 microns in diameter and is spaced from adjacent stipples by about 375 microns, as generally illustrated in FIG. 5; By incorporating such stipples on the surface of gasket, additional surface area is provided for bonding of the composition of the present invention to the polymeric gasket material. FIG. 2 illustrated a cross section of the window assembly of FIG. 1, taken along plane II—II. The stipples of the present invention formed on the exterior surface of gasket 40, are disposed immediately adjacent to vehicle mounting channel 30.

Figure 3:
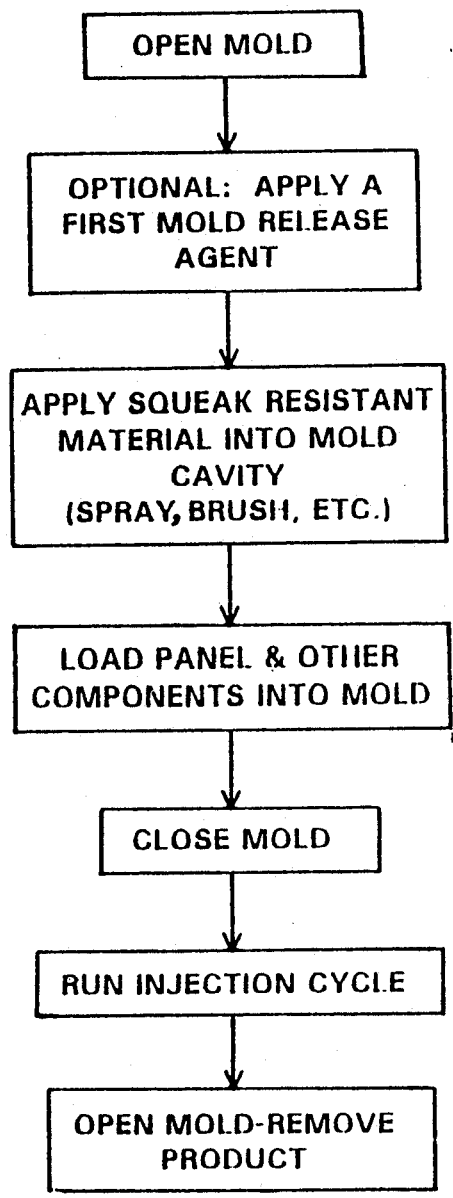
FIG. 3 is a flow diagram illustrating an in-mold application of the present invention.

Referring to FIG. 3, an in-mold process is shown in which a polymeric gasket containing the squeak resistant composition is molded about the perimeter of a panel or window resulting in a modular window assembly of the present invention. First, the molding apparatus is opened to receive a panel or window onto which a gasket is to be molded about. A sufficient amount of the composition of the present invention is applied to the surfaces forming the mold cavity. Application may be through a variety of methods such as spraying, brushing or the like. Next, the panel or window piece, and other components if any, are placed into the mold. The molding apparatus is then closed and the molding operation performed by injecting the polymeric material into the mold cavity. After the cycle is complete, the resulting modular window assembly is then removed and may be installed in the vehicle.

Figure 4:
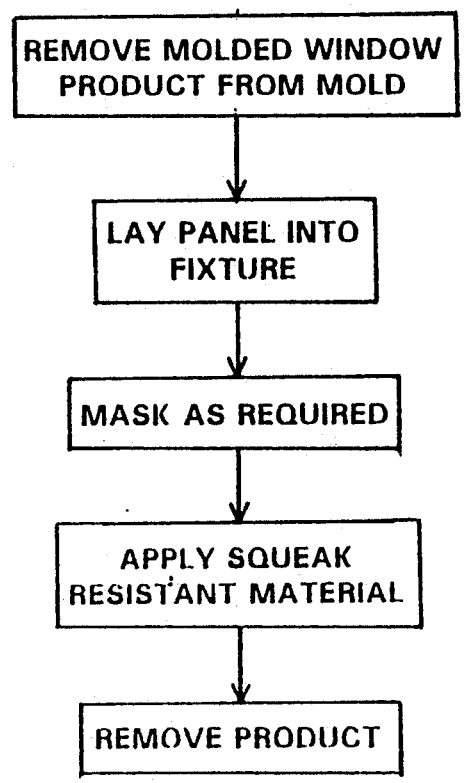
FIG. 4 is a flow diagram illustrating a post-mold application of the present invention.

FIG. 4 illustrates a post-mold operation in which a modular window assembly is formed, however without the composition of the present invention functioning as a mold release agent. In this instance, after the modular window assembly is formed, the areas not to receive the squeak resistant coating are masked if necessary. Then, sufficient amounts of the composition are applied to the desired areas before the window assembly is installed in the vehicle.

EXAMPLES 1-9

A composition according to the present invention was formulated as follows: A high temperature wax binder was used having a softening point of 82° C. and a melting point of 105° C., is available from Chem-Trend, Inc. of Howell, Mich., pre-dispersed in naptha to approximately 5% by weight. Various amounts of lubricants, including zinc stearate (ED ™ heat-stable powder from Witco Corporation of New York, N.Y.) and calcium stearate (from Witco Corp.), and naptha were then added to the binder resulting in the formulations given below in Table 1.

TABLE 1

| Example No. | Lubricant ZnSt[1] | Lubricant CaSt[2] | Binder (CT-2007 ™)[3] | Carrier Naptha[4] | Dye[5] | Carbon Black[6] |
|---|---|---|---|---|---|---|
| 1 | 0 | 0 | 100 | 0 | 0 | 0 |
| 2 | 40 | 0 | 0 | 60 (Thinned to spray) | 0 | 0 |
| 3 | 2.78 | 0 | 88.89 | 8.33 | 0 | 0 |
| 4 | 8.33 | 0 | 66.67 | 25 | 0 | 0 |
| 5 | 15 | 0 | 50 | 35 | 0 | 0 |
| 6 | 24 | 0 | 40 | 36 | 0 | 0 |
| 7 | 10 | 0 | 50 | 39.5 | 0 | 0.5 |
| 8 | 15 | 0 | 50 | 34.5 | 0.5 | 0 |
| 9 | 0 | 15 | 50 | 35 | 0 | 0 |

[1] Zinc Stearate from Witco Corporation, New York, NY.
[2] Calcium Stearate, regular grade from Witco Corporation, New York, NY.
[3] From Chem-Trend Inc., Howell, MI. (Approx. 5% solids.)
[4] From ChemCentral, type VM&P Grand Rapids, MI.
[5] UV Dye from BASF Wyandotte Corporation, Holland, MI. Fluorol Green Gold 084.#205661.
[6] From Cabot Corporation, Waitham, MA. Grade: Regal 400R GP-3084.

The ingredients were then rolled in a ball mill for approximately 10 hours. The formulations were sprayed onto the mold surface as a mold release agent in an in-mold operation prior to initiating a RIM—urethane process. The resulting backlite assemblies formed were then mounted on the rear of a 1992 automobile. The automobile was then driven over a bumpy grass field, and over mild curbs while listening to the rear of the automobile for squeaks or other undesirable noises. The following Table 2 summarizes the results of testing of various formulations. The percentages given reflect the final amount of lubricant existing in the squeak resistant composition after application (i.e. no solvent).

TABLE 2

| Example | Formulation (weight percent lubricant) | Squeak Vulnerability |
|---|---|---|
| 1 | 0 | Squeak |
| 2 | 100 (no wax) | No audible squeak |
| 3 | 38.5 | Minimal squeak |
| 4 | 71.4 | No audible squeak |
| 5 | 85.7 | No audible squeak |
| 6 | 92.3 | No audible squeak |
| 7 | 76.9 | Minimal squeak |
| 8 | 83.3 | No audible squeak |
| 9 | 85.7 | No audible squeak |

It should be noted that the present invention is not to be limited to automobiles. A multitude of other applications are envisioned where a mounting structure and window assembly interface are subject to external forces such as shifting, torque, and vibrations resulting in squeaks and other undesirable noises, such as airplanes, marine craft, trains, and buses.

Of course, it is understood that the foregoing is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A vehicle panel/window assembly for incorporation into a vehicle, said panel/window assembly comprising:
   a panel;
   a polymeric gasket around the perimeter of said panel; and
   a relatively thin coating of a squeak resistant composition on said polymeric gasket, said composition comprising a waxy binder having a relatively high softening point and a lubricant, applied onto at least portions of said gasket which will engage portions of the vehicle to which said panel/window assembly is to be joined.

2. A vehicle panel assembly in accordance with claim 1 wherein said binder has a softening point of above about 80° C., possesses a film forming characteristic, and is substantially water insoluble.

3. A vehicle panel assembly in accordance with claim 1 wherein said lubricant is selected from the group consisting of metallic carboxylate lubricants, molybdenum disulfide, tungsten disulfide, graphite, boron nitride, phosphate lubricants, silicones, metallic soaps and fluoropolymer lubricants.

4. A vehicle panel assembly in accordance with claim 1 wherein said lubricant is zinc stearate.

5. A vehicle panel assembly in accordance with claim 1 wherein the ratio of said binder to said lubricant is in the range of about 1:0.1 to about 1:10 parts of said binder to parts of said lubricant respectively.

6. A vehicle panel assembly in accordance with claim 1 wherein said polymeric gasket contains a plurality of stipples formed on the surface of said polymeric gasket to provide additional surface area for said composition to adhere to, each said stipple being about 75 microns to about 125 microns in depth and about 2,000 microns in diameter.

7. A vehicle panel assembly in accordance with claim 1 wherein said coating of said squeak resistant composition has a thickness of about 2 microns to about 10 microns.

8. A vehicle panel assembly in accordance with claim 2 wherein said binder is a wax selected from the group consisting of natural waxes, vegetable waxes, mineral waxes and synthetic waxes.

9. A vehicle panel assembly in accordance with claim 8 wherein said lubricant is selected from the group consisting of metallic carboxylate lubricants, molybdenum disulfide, tungsten disulfide, graphite, boron nitride, phosphate lubricants, silicones, metallic soaps and fluoropolymer lubricants.

10. A vehicle panel assembly in accordance with claim 8 wherein said lubricant is zinc stearate.

11. A vehicle panel assembly in accordance with claim 8 wherein the ratio of said binder to said lubricant is in the range of about 1:0.1 to about 1:10 parts of said binder to parts of said lubricant respectively.

* * * * *